United States Patent [19]
Arvidsson

[11] 3,724,697
[45] Apr. 3, 1973

[54] TRUCK HAVING A VERTICALLY DISPLACEABLE CARRYING FRAME

[75] Inventor: Carl-Eric Arvidsson, Laholm, Sweden

[73] Assignee: Lagaholm AB, Laholm, Sweden

[22] Filed: June 1, 1971

[21] Appl. No.: 148,783

[30] Foreign Application Priority Data
June 15, 1970 Sweden..........................8288/70

[52] U.S. Cl.................214/515, 214/512, 280/150 G
[51] Int. Cl. ............................................B60p 1/64
[58] Field of Search.........214/515; 280/43.18, 150 G

[56] References Cited

UNITED STATES PATENTS 3,501,165   3/1970   Nordby............................214/515 X
2,780,876   2/1957   Inman............................280/43.18 X Primary Examiner—Albert J. Makay
Attorney—Harness, Dickey & Pierce

[57] ABSTRACT

An arrangement in loading trucks having a support frame which is movable relatively the truck chassis, and a detachable loading platform supported on said frame. The invention comprises traction means by means of which the support frame is connected to the truck chassis in such a way that the springs of the rear axle are compressed at the raising of the support frame, resulting in levelling of the truck chassis at the rear, and also locking means ensuring that the compression is retained independently of the movements of the support frame, and means for releasing such locking when the support frame is in an upper position.

5 Claims, 8 Drawing Figures

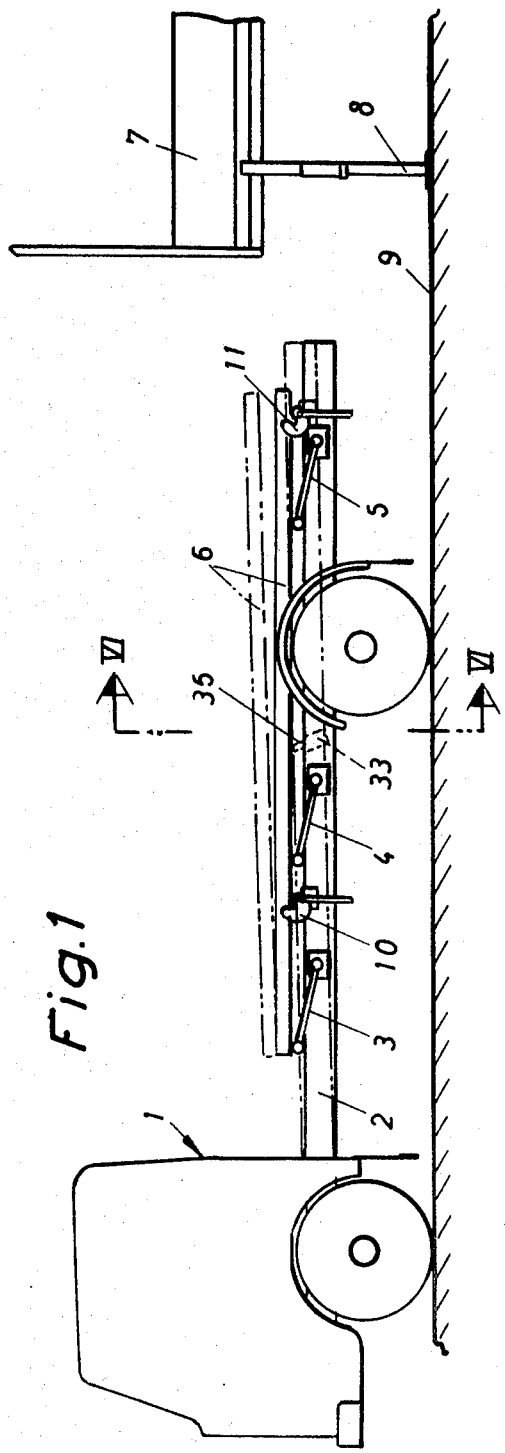
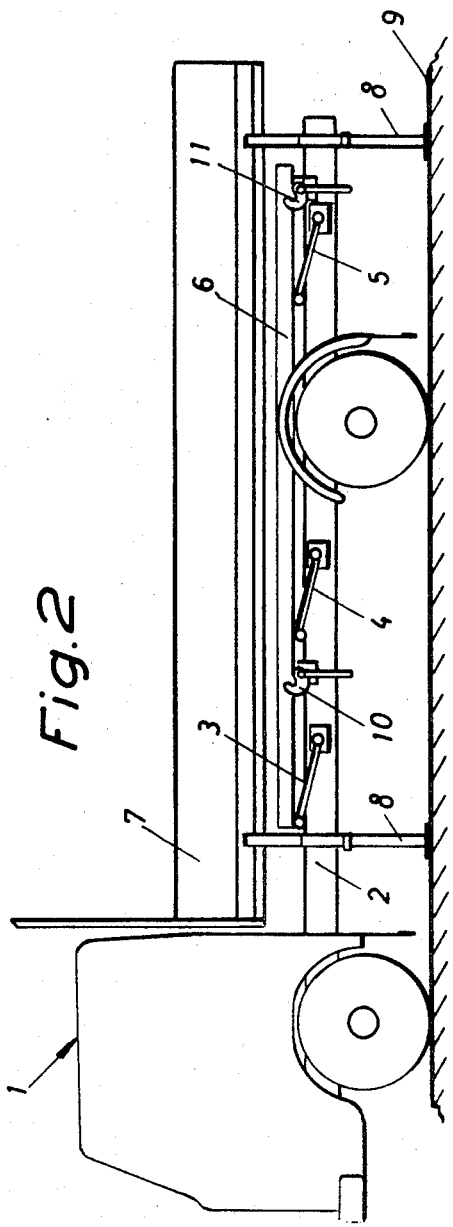

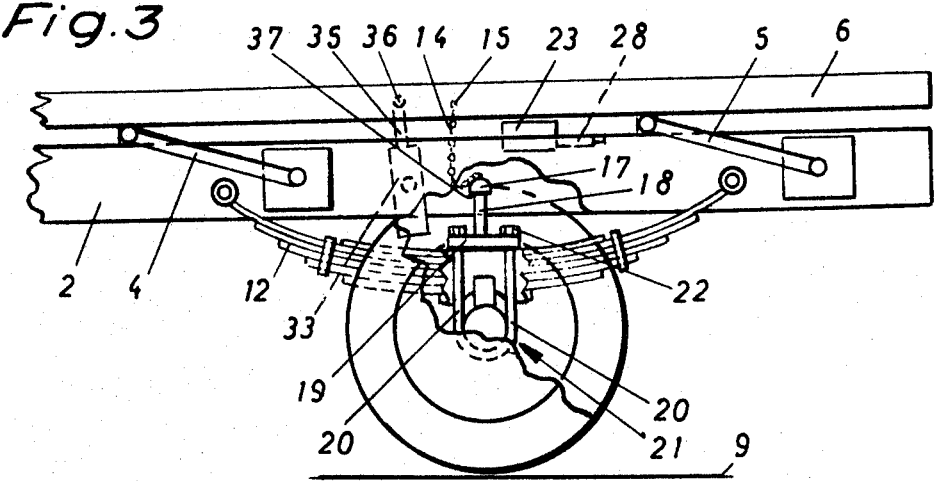
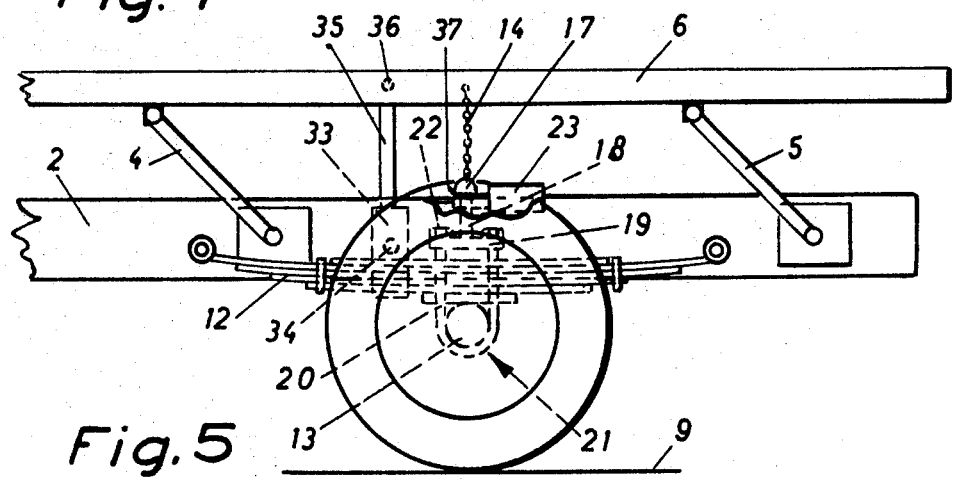
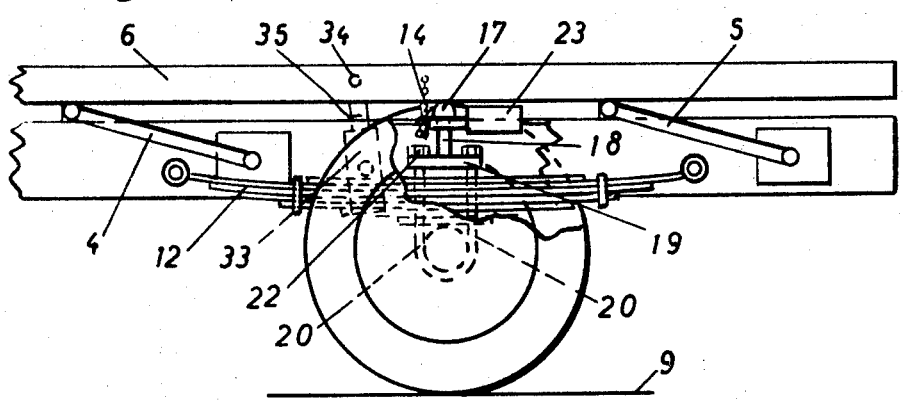

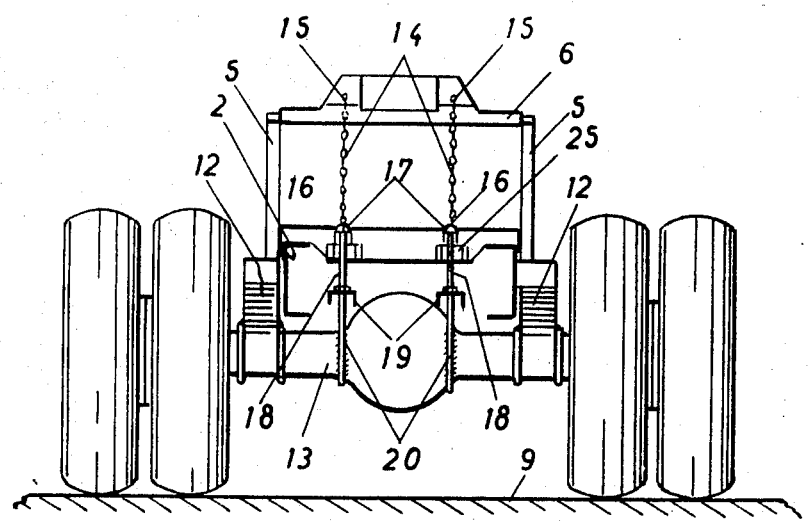

3,724,697

TRUCK HAVING A VERTICALLY DISPLACEABLE CARRYING FRAME

BACKGROUND OF THE INVENTION

The present invention relates to loading vehicles or trucks of the kind having a support frame which is arranged to be raised and lowered relatively the truck chassis and which is intended to support a detachable loading platform.

When goods is being transferred, for instance from a loading quay, onto a loading platform of this kind, while the latter is supported on legs, it is important that the loading platform is substantially level with the loading quay as otherwise both loading and unloading operations become difficult. When the loading platform, completely filled with goods, is to be driven away while carried by its loading vehicle, the truck is driven backwards such that its entire chassis moves in underneath the loading platform and lifts the platform with the aid of the support frame, permitting the support legs of the platform to be folded, whereafter the platform, together with the support frame, is lowered down towards the truck chassis and the platform, now in position on the truck, may be driven away.

In certain kinds of loading trucks, for instance those manufactured by Volvo and Scania, the chassis is not completely horizontal when the truck carries no load but in such cases arranged at a slight angle such that it extends obliquely in a direction backwards upwards, making it impossible to back the vehicle without further in underneath the loading platform when the latter is standing freely on its legs, particularly in case the platform is to be level with a conventional loading quay during loading, i.e. at a level of 130 cm from the ground.

SUMMARY OF THE INVENTION

The purpose of the present invention is to render possible to back loading trucks of the above-mentioned type and also other types of loading vehicles which, when their loading area or platform carries no load, have their chassis extending obliquely backwards upwards — in beneath the platform standing freely on its legs, supported at "normal height". The invention is characterized in that the support frame is connected to the rear axle of the truck by means of traction means in such a way that raising of the support frame brings about compression of the springs of the rear axle, and in that the truck is provided with means for locking the rear axle to the truck chassis after such compression of the springs while retaining said compression irrespective of the position of the support frame, and also with means for releasing said locking when the support frame is in an upper position.

The invention will be described more in detail in the following with reference to the accompanying, partly diagrammatic drawings.

BRIEF DESCRIPTION OF THE DRAWINGS

FIG. 1 is a side view of a loading truck shown together with its loading platform in a position behind the truck.

FIG. 2 is a similar view showing the truck having been backed in underneath the loading platform.

FIG. 3 shows on an enlarged scale a partly broken side view of the rear portion of the loading truck in truck driving position.

FIG. 4 is a similar view showing the support frame in raised position.

FIG. 5 illustrates the support frame in its lowered position wherein the rear axis springs are compressed.

FIG. 6 illustrates on an enlarged scale a vertical section through the loading truck with the support frame in raised position, the section being taken along line VI—VI of FIG. 1.

DETAILED DESCRIPTION OF A PREFERRED EMBODIMENT

Figure 7:
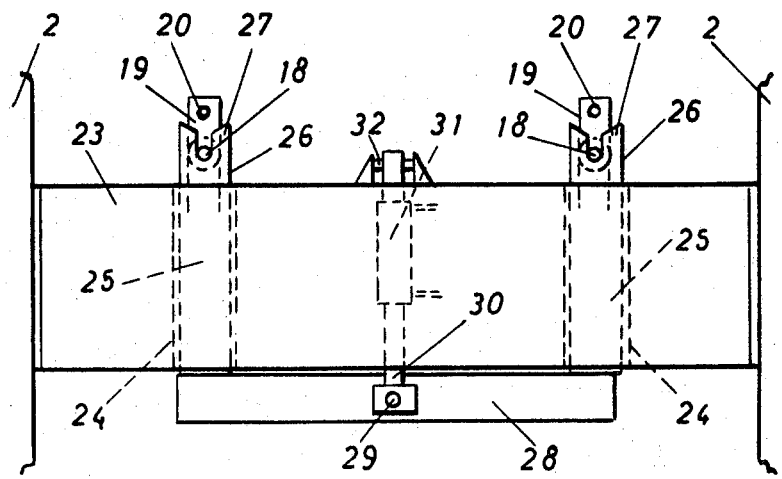
FIG. 7 shows on an enlarged scale a plan view of the locking means incorporated in the truck, the locking means being in the locked position.

The chassis 2 of the loading vehicle or truck 1 illustrated on the drawings is provided with a parallel linkage arrangement, comprising three pairs of link arms 3, 4 and 5 by means of which the vehicle chassis 2 is hingedly connected with a support frame 6 intended to carry the loading platform 7 of the truck. The loading platform 7 is provided with legs 8 which are extendable and retractable or foldable and adapted to support the platform on the ground 9. In its lowered position, the support frame 6 may be attached to the chassis 2 by means of clamping means 10, 11.

The vehicle is provided with a compressing device in accordance with the invention by means of which the springs 12 for the rear axle 13 of the vehicle may be compressed. The compressing device comprises in accordance with the embodiment illustrated two chains 14 each one of which has its upper end 15 secured to the support frame 6 and its lower end 16 secured to a head 17. Each head 17 is arranged on a vertically extending connecting rod 18, the lower end of each such connecting rod 18 being attached to a cross piece 19. Through the latter pass the two upwardly extending legs 20 of a U-shaped bow 21 which from underneath straddles the rear axle 13. The portions of the legs 20 extending above the cross piece 19 are provided with nuts 22.

Figure 8:
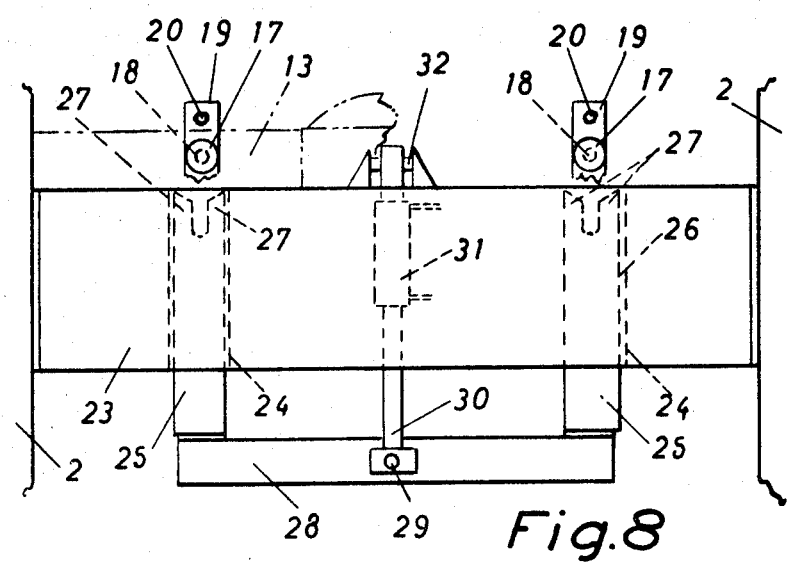
FIG. 8 shows said locking means in release position.

In addition, the vehicle is provided with a locking means for retaining the connecting rods 18 in a position wherein the springs 12 are in compressed condition. One example of such locking means is illustrated in plan view in FIGS. 7 and 8. On one of the cross beams 23 of the chassis 2 are arranged two guides 24 extending in the longitudinal direction of the vehicle and adapted to receive one locking arm 25 each. The forward end 26 of each locking arm 25 is shaped like a fork with the two legs 27 of the fork arranged in such a way as to be able to grasp the associated connecting rod 18 below the head 17 formed thereon when the locking arms 25 are being displaced forwards. At their opposite ends the locking arms 25 are interconnected by means of a yoke 28 on which is provided a bolt 29 to hingedly connect the yoke with the rear end of the piston 30 of a hydraulically operated cylinder unit 31 which in turn by means of a bolt 32 is hingedly connected to the cross beam 23. The cylinder 31, which preferably is double-acting, is by means of conduits (not shown) in communication with the vehicle pressurized oil system.

Also connected to this pressurized oil system is an hydraulically operated cylinder 33 which is pivotably mounted on the chassis 2 as to pivot about a shaft 34, said cylinder having its piston 35 hingedly connected to the support frame 6 by means of an axle spindle 36. In reality, at least two such hydraulically operated cylinders 33 with pistons 35 are generally required to lift and lower the support frame 6.

The device operates in the following manner: In order that it be possible to back the vehicle 1 the chassis 2 and support frame 6 of which, in unloaded condition, extend obliquely upwards at its rear as indicated in dash-and-dot lines in FIG. 1, in underneath the platform 7, the rear portion of the chassis must be lowered. In accordance with the invention this is effected by compressing the springs 12 of the rear axle 13. The compression is carried out in the following manner.

Initially, the support frame 6 is swung to its upper position (FIG. 4) by means of the piston 35 of the hydraulic cylinder 33 and with the aid of the link arms 3, 4 and 5, the chains 14 then being stretched while compressing the springs 12. In this position the locking arms 25 — which upon compression of the springs 12 have taken part in the lowering motion of the rear portion of the chassis 2 — are in a position somewhat below head 17. When at this point pressurized oil is applied to the cylinder 31 at the rear end thereof (lower end in accordance with FIGS. 7 and 8) yoke 28 together with locking arms 25 are urged forwards bringing the fork legs 27 of the locking arms to enclose the connecting rod 18 below head 17, the lower end 37 of which serves as a blocking abutment locking the rear axle 13 to the chassis 2. When the support frame 6 has reached its lower position (FIG. 5) the loading truck 1 may be driven backwards to a position underneath the loading platform 7 (FIG. 2), the platform being imagined fully loaded. The support frame 6 is again raised, lifting the loading platform 7, whereupon the legs 8 are folded underneath the platform. At the same time the locking is released through application of pressurized oil on the cylinder 31 at the forward end thereof, whereby the locking arms 25 are displaced backwards out of engagement with the connecting rods 18 and the heads 17 thereon. When the support frame 6 together with the loading platform 7 are thereafter lowered to driving position (FIG. 3) the springs 12 are released and may, as usual, absorb the stresses from the load during driving.

Before starting the transport, the support frame 6 is locked by means of clamping means 10 and 11 to the chassis 2. To retain the loading platform 7 on the support frame 6 during driving securing means, not illustrated in detail in the drawings, are provided.

The embodiment as shown and described is to be regarded as an example only. Particularly the securing means to retain the support frame on the chassis after compression of springs 12, as also the device for compressing the springs, may be constructively altered in many ways within the frame of the appended claims. The compression of the springs need not necessarily be carried out through lifting the support frame 6 but may be effected for instance with the aid of an hydraulically operated piston and cylinder unit or by means of some lever mechanism particularly provided for this purpose. Head 17 may be replaced by a nut screwed onto the upper end of each rod 18 with attachments for the lower end of chain 14.

What I claim is:

1. An improvement in loading trucks of the type having a support frame, a truck chassis, means for supporting said support frame for vertical movement relative to said truck chassis, a detachable loading platform adapted to be supported by said support frame, a rear axle, and spring means for suspending said chassis from said rear axle, the improvement comprising traction means operatively connected to said support frame and to said rear axle for compressing said spring means upon the raising of said support frame, and locking means for locking said rear axle to said truck chassis after compression of said spring means for retaining said spring means under compression regardless of the position of said support frame.

2. An improvement in accordance with claim 1, wherein the traction means comprises flexible means, and vertical rods fixed at the rear axle, one end of said flexible means being attached to said support frame and the opposite end of said flexible means being attached to the upper end of said vertical rods, the locking means comprising locking arms and a blocking abutment for cooperation with said locking arms.

3. An improvement in accordance with claim 2, wherein the locking arms are arranged for insertion beneath its respective blocking abutment to lock said springs in a compressed condition.

4. An improvement in accordance with claim 3, wherein the locking means further comprises a yoke interconnected to one end of said locking arms so as to permit displacement of said locking arms in parallel backwards and forwards movement on the truck chassis, a hydraulically operated piston and cylinder unit being provided to effect such parallel displacement.

5. An improvement in accordance with claim 2, comprising a nut or a head arranged at the upper end of said rods and connected to the respective chain or the like, the lower face of said nut or head forming said blocking abutment, the locking arms being of fork-like configuration at the locking end thereof with the legs of the fork clamping its respective rod so as to enclose it on either side beneath said blocking abutment when the device is in locking position.

* * * * *